United States Patent Office 3,523,898
Patented Aug. 11, 1970

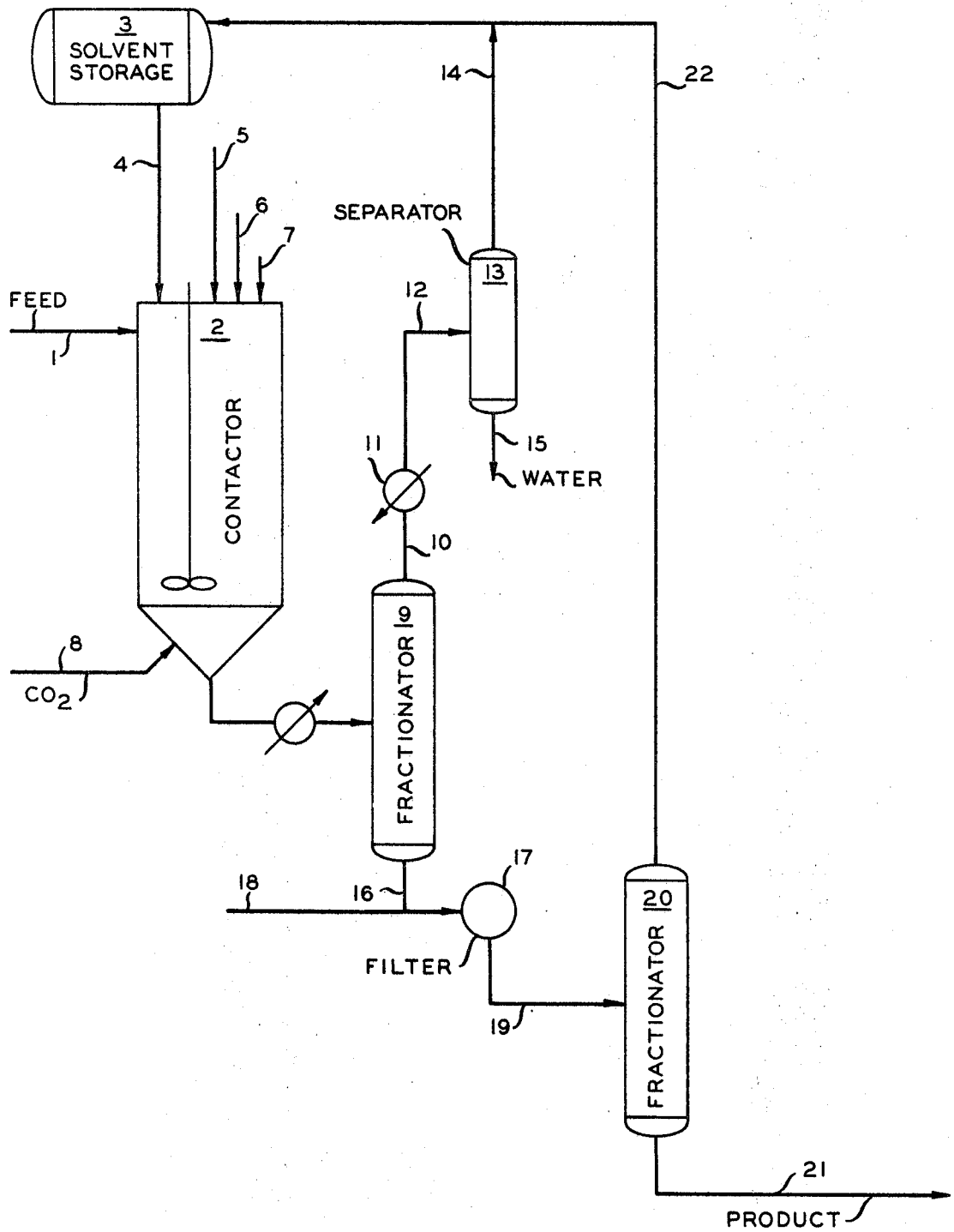

3,523,898
INCREASED BASE NUMBER METAL PETROLEUM SULFONATE AND PROCESS FOR ITS PREPARATION
Albert N. De Vault, Bartlesville, Okla., assignor to Phillips Petroleum Company, a corporation of Delaware
Filed Apr. 5, 1966, Ser. No. 540,229
Int. Cl. C10m 1/10, 1/40
U.S. Cl. 252—33
6 Claims

ABSTRACT OF THE DISCLOSURE

Overbased metal petroleum sulfonates are formed by reacting a sulfonic acid or metal salt thereof with metal base and carbon dioxide in the presence of an alkylated phenol sulfonic acid having 10–24 carbon atoms in the alkyl group. The inventive sulfonates are used as detergents in lubricating oils.

In copending application Ser. No. 540,022, filed Apr. 4, 1966, by Albert N. De Vault there is described and claimed an overbasing process, producing a very high base number product employing phenol as a treating agent or catalyst. By the process of the present invention, the separation and recycle of the phenol catalyst is completely eliminated.

This invention relates to a novel overbased metal petroleum sulfonate, e.g., overbased calcium petroleum sulfonate.

In one of its aspects, the invention relates to an overbased metal, e.g., calcium petroleum sulfonate which is prepared by treating a petroleum sulfonic acid and/or a calcium petroleum sulfonate with lime and carbon dioxide in the presence of an alkylated phenol sulfonic acid to increase the base number thereof.

The product of the invention finds an important use in adding detergency to lubricating oils.

Thus, metal petroluem sulfonates are being increasingly used in the manufacture of additives for lube oils, especially as these are used in internal combustion engines, to impart detergency to the oils for keeping the engine parts clean and to reduce sludge formation. As is known, the detergency is destroyed as acid formed during combustion of fuels react with the basic petroleum sulfonates. As this occurs, the acids are increasingly free to attack the engine parts. The effective life span of the lube oil additives is increased by the overbasing process which, in effect, increases the alkaline reserve of the oil composition ultimately used.

Alkaline reserve or TBN is defined as the number of milligrams of potassium hydroxide equivalent to the acid required to neutralize the alkalinity in one gram of sample to a pH of four.

A metal petroleum sulfonate having a TBN higher than obtained by simple neutralization of sulfonic acid is said to be "overbased."

I have found that neutralization and/or overbasing can be effected advantageously by treating the petroleum sulfonic acids or the calcium petroleum sulfonates or a mixture of these materials with lime and carbon dioxide in the presence of an alkylated phenol sulfonic acid.

Further, I have found that, when an alkylated phenol sulfonic acid is used, the alkylated calcium phenol sulfonate formed during the neutralization-overbasing step is a detergent on its own and, therefore, can be left in the product.

It is an object of this invention to provide an increased base number metal petroleum sulfonate. It is another object of this invention to provide a process for preparing an improved increased base number metal petroleum sulfonate. It is a further object of this invention to so prepare a metal petroleum sulfonate suitable for use as an additive to lubricating oil for improving its detergency that the agent required in the overbasing step or operation forms a detergent useful in the oil. It is a further object of the invention to provide a process for the production of an overbased metal petroleum sulfonate suitable for use as a detergency providing additive for lubricating oils in which process an agent used in the overbasing step is such that no recovery of it or any reaction product formed by it is necessary.

Other aspects, objects and the several advantages of this invention are apparent from this description, the drawing and the appended claims.

According to the present invention, there is provided a novel metal petroleum sulfonate having an increased base number by a process which comprises treating at least one of a petroleum sulfonic acid or a calcium petroleum sulfonate with lime and carbon dioxide in the presence of an alkylated phenol sulfonic acid.

Alkylated phenol sulfonic acids which can be used in the process of the invention include those which can be represented by the formula

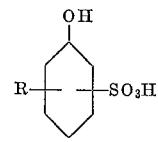

in which R is an alkyl group having approximately 10 to 24 carbon atoms, e.g., a hexadecylphenolsulfonic acid. Other compounds which can be used are 2-decyl-4-hydroxybenzenesulfonic acid
3-tetradecyl-5-hydroxybenzenesulfonic acid
4-hexadecyl-2-hydroxybenzenesulfonic acid
6-octadecyl-2-hydroxybenzenesulfonic acid
3-tetracosyl-5-hydroxybenzenesulfonic acid
3-(4-methylundecyl)-6-hydroxybenzenesulfonic acid
2-(11-methyldodecyl)-5-hydroxybenzenesulfonic acid and the like.

Alkylated phenol sulfonic acids in which the alkyl group has less than 10 carbon atoms tend to become water soluble and oil insoluble. Acids having in the alkyl group more than 24 carbon atoms can be used, if desired.

The process of the invention can be applied to either the petroleum sulfonic acids, as are extant in the art, or to finished calcium petroleum sulfonates, for example those of U.S. Pat. 3,135,693 issued June 2, 1964. The neutralization and overbasing can be made to take place in a single contactor or, as desired, separate contactors can be employed for the two reactions. Further, a tray column or other contactor can be employed for introducing all or at least a part of the carbon dioxide, as will be evident to one skilled in the art having possession of this disclosure and having studied the same.

In a now preferred embodiment of the invention, there is employed a petroleum solvent which can be a petroleum naphtha, Stoddard solvent, kerosene, heptane, toluene, benzene, cyclohexane, and the like.

The unneutralized petroleum sulfonic acids and/or the calcium petroleum sulfonates are contacted in the presence of such a solvent, water, lime and any other material which may be desirable in a contactor with alkylated phenol sulfonic acid, according to the invention. Carbon dioxide can be fed into this contactor from which the reaction product is then passed to a fractionator for recovery of solvent, the overbased product then being filtered and recovered as more fully described below. The neutralized and overbased product, still admixed with solvent, is heated to recover at least part of the solvent and the water. If desired, additional solvent can be added prior to a filtering step, following which this solvent and any solvent resulting from the initial contacting step are recovered for reuse as may be desired.

The approximate ranges in weight ratio of the materials charged to the contactor to the petroleum sulfonic acid or calcium petroleum sulfonate are:

|  | Parts by weight per 100 parts of— | |
| --- | --- | --- |
|  | Sulfonic acid | Sulfonate |
| Ca(OH)$_2$ | 25–100 | 5–25 |
| H$_2$O | 2–10 | 2–10 |
| Solvent | 200–500 | 200–500 |
| Phenol sulfonic acid | 1–25 | 1–25 |

Preferably sufficient carbon dioxide is charged to the contactor so that an excess is bubbling through the stirred mixture at all times. Contacting is usually carried out at atmospheric pressure and at temperatures in the range of 50–200° F., the upper temperature limit being at least 10–20° F. below the boiling point of the solvent used. Contact times of 1 minute to 1 hour are usually used. The foregoing table illustrates the ranges which are now considered useful and are now preferred. However, it will be evident to those skilled in this art that concentrations outside the given ranges can be used.

It is apparent that the product or composition of the invention contains the reaction product of the alkylated phenol sulfonic acid which has been used. Thus, this product, which can be termed an alkylated calcium phenol sulfonate, is a detergent and is present in the product and useful therein.

From the foregoing table, it is apparent that good leeway is present in the amount of phenol sulfonic acid used. Thus, depending upon the ultimate detergency required or desirable, considerable variation can be had of the amount of phenol sulfonic acid used. Presently, a preferred range for this acid is from about 5 to about 10 percent.

EXAMPLE

Tests can be made in which the contactor charge (parts by weight) is:

| Test No. | 1 | 2 | 3 | 4 |
| --- | --- | --- | --- | --- |
| Petroleum sulfonic acid [1] | 100 | 100 | | |
| Calcium petroleum sulfonate [2] | | | 100 | 100 |
| Ca(OH)$_2$ | 50 | 50 | 15 | 15 |
| H$_2$O | 6 | 6 | 6 | 6 |
| Stoddard solvent [3] | 300 | 300 | 300 | 300 |
| Alkyl Phenol sulfonic acid [4] | 10 | | 10 | |

[1] Stream 19, U.S. 3,135,693.
[2] Product of U.S. 3,135,693.
[3] A petroleum distillate having a 50% point of 350° F. and an end point of 410° F.
[4] Hexadecyphenolsulfonic acid.

In each test contacting was for 30 minutes at atmospheric pressure and temperature, and carbon dioxide was bubbled through the stirred mixture. The water and most of the solvent were removed by heating the mixture to 410° F. Six hundred parts by weight of Stoddard solvent were added, and the solution was filtered to remove solids. The filtrate was freed of solvent by stripping with nitrogen at 410° F. The TBN values obtained were:

| Test number: | TBN value |
| --- | --- |
| 1 | 150 |
| 2 | 10 |
| 3 | 100 |
| 4 | 10 |

The particular petroleum sulfonic acid and/or calcium petroleum sulfonate used as an ingredient in this invention, as it has been described, is not limiting thereof. Other equivalent ingredient or ingredients can be used.

Referring now to the drawing, unneutralized petroleum sulfonic acid or calcium petroleum sulfonate is passed by conduit 1 into contactor 2 in which it is contacted with solvent passed from solvent storage 3 by way of conduit 4, alkylated phenol sulfonic acid entering by conduit 5, water by conduit 6, and lime by conduit 7, and, upon agitation, treated with carbon dioxide sparged in near the bottom of the contactor by way of conduit 8. The reacted mass is heated and passed to fractionator 9 in which at least a part of the solvent and water are flashed overhead by way of conduit 10. The water and solvent are passed by way of cooler 11, conduit 12 into separator 13 overhead from which passes by conduit 14 to solvent storage 3. Bottoms from separator 13 are water and are removed at 15. Bottoms from fractionator 9 containing overbase product are passed by conduit 16 into filter 17. If desired, additional suitable solvent can be added at 18. The filter separates undesired solids and the overbased product containing solvent is passed by conduit 19 to fractionator 20, from the base of which overbased product is removed at 21. Solvent flashed overhead by conduit 22 is returned to solvent storage 3.

While the invention has been described with reference to lime or calcium hydroxide, equivalent basic materials are within the scope of the invention and appended claims to the extent one skilled in the art upon mere routine test will find these operative. For example, other alkaline earth metal hydroxides or bases can be used.

Reasonable variation and modification are possible within the scope of the foregoing disclosure, the drawing and the appended claims to the invention the essence of which is that, in the overbasing of a petroleum sulfonic acid and/or a calcium petroleum sulfonate, there is employed as agent an alkylated phenol sulfonic acid with the concomitant advantage that detergent material resulting from such use can advantageously and does remain in the ultimate product, thereby eliminating costly separation and recycle of agent.

I claim:
1. A process for the preparation of an overbased metal petroleum sulfonate by treating at least one of a petroleum sulfonic acid and a calcium petroleum sulfonate with an alkaline earth hydroxide and carbon dioxide which comprises performing the treatment in the presence of an agent consisting essentially of an alkylated phenol sulfonic acid in which the alkyl group contains 10–24 carbon atoms.

2. A process according to claim 1 hereof wherein the alkylated phenol sulfonic acid is present in an amount in the approximate range 5–10 percent based upon said at least one of a petroleum sulfonic acid or a calcium petroleum sulfonate.

3. A process according to claim 1 hereof wherein lime and carbon dioxide are used.

4. A process according to claim 3 wherein the alkylated phenol sulfonic acid can be represented by the formula

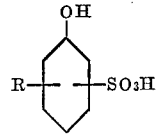

wherein R is an alkyl group having 10–24 carbon atoms.

5. A process according to claim 4 wherein the process is effected by bringing together the reactants and the alkylated phenol sulfonic acid in the presence of water and a petroleum solvent and an alkylated calcium sulfonate thus formed is retained in the product.

6. A process according to claim 5 wherein the alkylated sulfonic acid is at least one of the group as follows:

2-decyl-4-hydroxybenzenesulfonic acid
3-tetradecyl-5-hydroxybenzenesulfonic acid
4-hexadecyl-2-hydroxybenzenesulfonic acid
6-octadecyl-2-hydroxybenzenesulfonic acid
3-tetracosyl-5-hydroxybenzenesulfonic acid
3-(4-methylundecyl)-6-hydroxybenzenesulfonic acid
2-(11-methyldodecyl)-5-hydroxybenzenesulfonic acid
hexadecylphenosulfonic acid.

References Cited

UNITED STATES PATENTS

| | | | |
|---|---|---|---|
| 3,135,693 | 6/1964 | Whitney et al. | 260—504 X |
| 2,839,470 | 6/1958 | Warren et al. | 260—504 X |
| 2,695,910 | 11/1954 | Asseff et al. | 260—504 X |

DANIEL E. WYMAN, Primary Examiner

I. VAUGHN, Assistant Examiner